May 12, 1925.  1,537,814

D. W. EVANS

POULTRY NEST TRAP

Filed April 24, 1922

Inventor.
David W. Evans
by H. J. S. Dennison
Atty.

Patented May 12, 1925.

1,537,814

UNITED STATES PATENT OFFICE.

DAVID W. EVANS, OF NEWMARKET, ONTARIO, CANADA.

POULTRY-NEST TRAP.

Application filed April 24, 1922. Serial No. 556,156.

*To all whom it may concern:*

Be it known that I, DAVID W. EVANS, a subject of the King of Great Britain, and resident of the town of Newmarket, county of York, Province of Ontario, in the Dominion of Canada, have invented certain new and useful Improvements in Poultry-Nest Traps, described in the following specification and illustrated in the accompanying drawings, that form part of the same.

The principal objects of the invention are to provide a trap for poultry nests which will be very sensitive in its operation and will securely close the nest from ingress of other fowl while the nest is occupied and will hold the fowl trapped securely within the nest until released.

A further object is to devise a form of trap which will allow the opening of the entire nest front to facilitate the cleaning of the nest and the removal of broody hens and further to devise a trap of simple and cheap construction which will not be liable to get out of order.

The principal feature of the invention consists in the novel construction and arrangement of parts, whereby a closure for the nest is formed of a plurality of vertical bars supported on pivotal arms adapted to be folded back and to fall across the entrance to the nest and whereby said arms are held in the open position by a pivotal trip arranged between said bars and adapted to be withdrawn by the fowl entering the nest.

In the drawings, Figure 1 is a perspective view of my improved trap frame which is adapted to be secured at the open end of a nest, the trap being shown open in full lines and closed in dotted lines.

Figures 1, 2, 3:
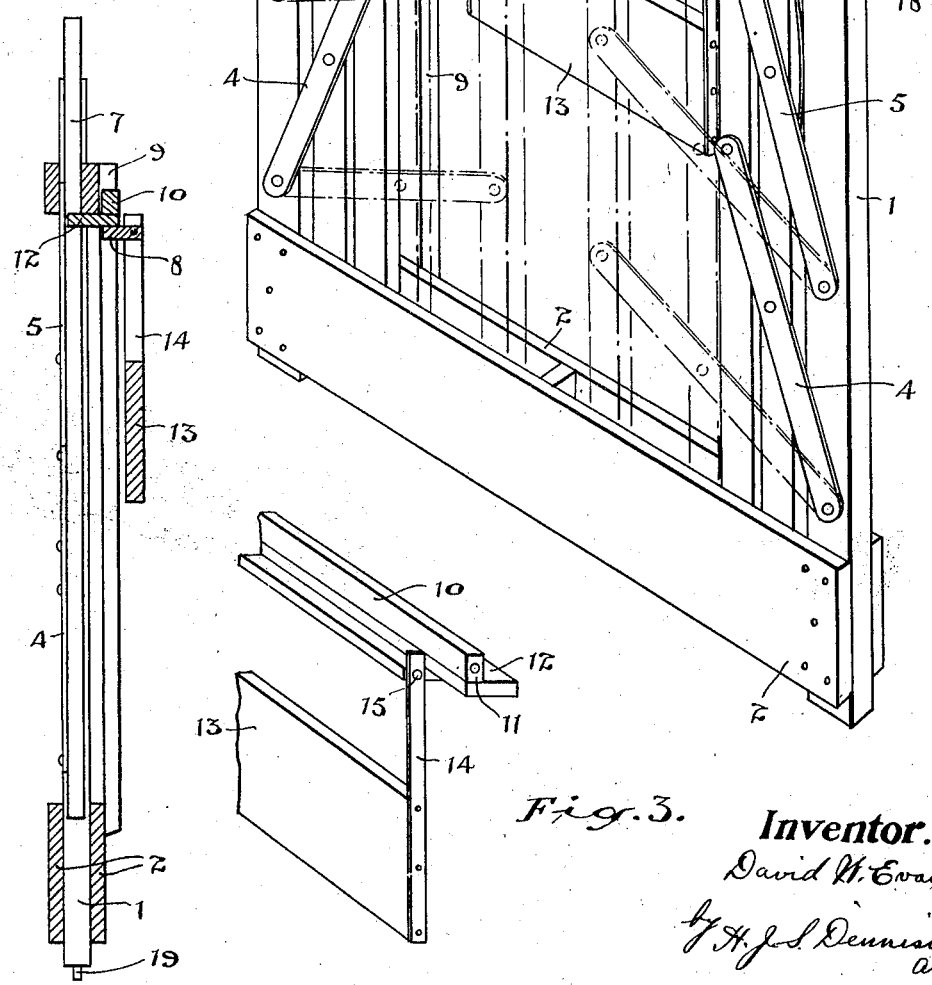
Figure 2 is a vertical sectional view showing the trap open, the trip being shown in dotted lines in releasing position.
Figure 3 is a perspective detail of the trip.

In the construction herein shown the trap is formed of a pair of upright posts 1 rigidly connected at the bottom by the cross boards 2.

A pair of cross strips 3 are rigidly secured adjacent to the tops of the posts 1, said strips and boards being equally spaced apart.

A pair of arms 4 and 5 are pivotally secured to each of the posts 1 and the vertical bars 6 and 7 are pivotally connected to the arms 4 and 5 at points equidistant from their pivotal connection with the post, thus forming an arrangement of parallelly moving members supported from both positions so that they will fall back close to the posts or will through the swinging of the arms 4 and 5 be spaced apart to close the opening to the nest as shown by the dotted lines in Figure 1.

The bars 6 and 7 are held in their outward positions by a trip member 8 which is pivotally supported from the inner side of the posts 1 upon blocks 9. This trip member is formed of a wooden bar 10 having extension lugs 11 at the ends and projecting from the top portion into which pivot pins secured in the blocks 9 extend.

A horizontally extending board 12 is secured to the forward side of the bar 10 and the ends of this board engage the inner bars 7 holding them apart.

Depending from the bar 10 is a board 13 provided with metal strips 14 at the ends which are hinged upon pivot pins 15 secured in the ends of the bar 10. The metal strips are free to swing freely in an outward direction, that is, toward the board 12 without swinging the bar 10 on its pivot so that when the trap is reset the fowl may come out without interference, the board swinging freely but upon a fowl entering the nest its back or tail will engage the swinging board 13 and the ends of the metal strips 14 engaging the board 12 will prevent its swinging on its pivots 15, but the whole trip structure will swing on the pivots of the bar 10, thus drawing the board 12 from between the upright bars 7. When the bars are thus released they fall of their own weight pivoting on the arms 4 and 5 and move inward toward the centre to effectively close the opening to the nest.

Light spring arms 18 are secured to the inner sides of the post 1 and exert an inward pressure against the bars 6 to ensure their dropping into place upon the movement of the trip.

The whole structure is of a compact form and is preferably secured to the nest structure upon corner pivots 19 secured to one of the posts 1 so that it may be swung open as a gate when cleaning out the nest.

What I claim as my invention is:—

1. A poultry nest trap, comprising, a frame having rigid side posts, closure members pivoted toward the bottom of said posts to swing inward and downward, and me t able means suspended between said posts and engaging and holding said closure members spaced apart to form an opening therebetween.

2. A poultry nest trap, comprising, a frame having rigid side posts, pivotal arms secured to said posts and adapted to swing inward and carrying vertical bars pivotally connected thereto, and means pivotally suspended from the top of said frame between said bars for holding said bars in their outward folded position and adapted to swing to release the same allowing them to close.

3. A poultry nest trap, comprising, an open frame formed of side posts and parallelly spaced top and bottom members, pairs of parallel arms pivotally secured to the side posts, a plurality of vertical bars pivotally connected to said parallel arms at each side of the frame and adapted to swing downward and inward to close the opening, said vertical bars being arranged between the spaced top and bottom members, a trip member pivotally supported from the frame having a portion extending between said vertical bars when in their raised outward positions, and a downward extension depending from said trip member adapted to be engaged by the fowl on entering the nest.

DAVID W. EVANS.